(12) United States Patent
Kadowaki et al.

(10) Patent No.: US 9,285,629 B2
(45) Date of Patent: Mar. 15, 2016

(54) COLOR-CONVERTING SUBSTRATE AND LIQUID CRYSTAL DISPLAY DEVICE

(71) Applicant: Sharp Kabushiki Kaisha, Osaka (JP)

(72) Inventors: Shinya Kadowaki, Osaka (JP); Ryuzo Yuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/403,884

(22) PCT Filed: May 27, 2013

(86) PCT No.: PCT/JP2013/064599
§ 371 (c)(1),
(2) Date: Nov. 25, 2014

(87) PCT Pub. No.: WO2013/180052
PCT Pub. Date: Dec. 5, 2013

(65) Prior Publication Data
US 2015/0124188 A1    May 7, 2015

(30) Foreign Application Priority Data

May 28, 2012 (JP) .................. 2012-120556

(51) Int. Cl.
*G02F 1/1335* (2006.01)
*G02B 5/09* (2006.01)
*G02F 1/1368* (2006.01)
*G02B 5/02* (2006.01)
*G02B 5/20* (2006.01)

(52) U.S. Cl.
CPC ............ *G02F 1/133514* (2013.01); *G02B 5/09* (2013.01); *G02F 1/1368* (2013.01); *G02F 1/133528* (2013.01); *G02F 1/133553* (2013.01); *G02F 1/133617* (2013.01); *G02B 5/0278* (2013.01); *G02B 5/201* (2013.01); *G02F 2001/133562* (2013.01)

(58) Field of Classification Search
CPC .................... G02F 1/133514; G02F 1/133553; G02F 1/133617; G02F 1/133528; G02F 1/1368; G02F 2001/133562; G02B 5/09; G02B 5/201; G02B 5/0278
See application file for complete search history.

(56) References Cited

U.S. PATENT DOCUMENTS

| | | | |
|---|---|---|---|
| 6,469,755 B1 | 10/2002 | Adachi et al. | |
| 2002/0145685 A1 | 10/2002 | Mueller-Mach et al. | |
| 2014/0313691 A1 | 10/2014 | Kaida et al. | |

FOREIGN PATENT DOCUMENTS

| | | |
|---|---|---|
| JP | 2000-131683 A | 5/2000 |
| JP | 2003-5182 A | 1/2003 |
| JP | 2010-66437 A | 3/2010 |

(Continued)

*Primary Examiner* — Donald Raleigh
(74) *Attorney, Agent, or Firm* — Chen Yoshimura LLP

(57) ABSTRACT

A color conversion substrate and liquid crystal display device of the present invention simplify the manufacturing process thereof and reduce deviations in intensity distribution of emitted light. The color conversion substrate includes a transparent substrate having a first main surface, a phosphor layer having a plurality of phosphors arranged along the first main surface and a plurality of transparent first boundary parts formed so as to surround the respective phosphors, and a plurality of first reflective parts formed on the outer peripheral surface of the respective plurality of first boundary parts. The portions of the first boundary parts where the respective first reflective parts are formed are curved, and the curvature thereof is 0.50/d1 to 0.83/d1, where d1 is the thickness of the respective first boundary parts.

19 Claims, 14 Drawing Sheets

(56) References Cited

FOREIGN PATENT DOCUMENTS

| JP | WO 2012042803 A1 | * | 4/2012 | ........ G02F 1/133504 |
| JP | WO 2013039141 A1 | * | 3/2013 | ............. G02B 5/201 |

| WO | 2012/070204 A1 | 5/2012 |
| WO | 2012/161012 A1 | 11/2012 |
| WO | 2013/039141 A1 | 3/2013 |
| WO | 2013/058075 A1 | 4/2013 |

\* cited by examiner

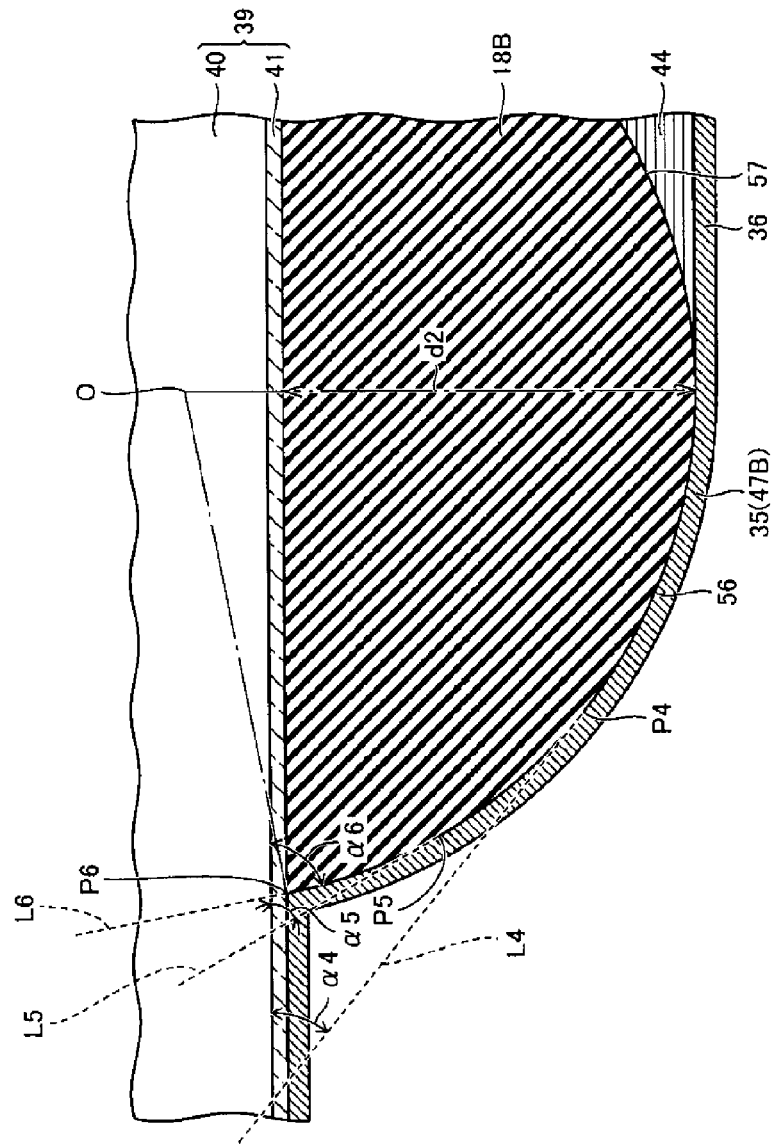
FIG. 9
FIG. 10

COLOR-CONVERTING SUBSTRATE AND LIQUID CRYSTAL DISPLAY DEVICE

TECHNICAL FIELD

The present invention relates to a color conversion substrate and a liquid crystal display device.

BACKGROUND ART

Various image display devices provided with a phosphor substrate have been proposed up to now. The display devices disclosed in Japanese Patent Application Laid-Open Publication No. 2000-131683 and Japanese Patent Application Laid-Open Publication No. 2003-5182, for example, are provided with a liquid crystal display component, a light source that illuminates the liquid crystal display component from the rear side, and a wavelength converting section. The wavelength converting section includes at least one type of phosphor for converting wavelength that converts the light from the light source into red or green, the wavelength converting section being provided for each pixel on the light emitting side of the liquid crystal display component.

Furthermore, the display device disclosed in Japanese Patent Application Laid-Open Publication No. 2010-66437 is provided with a front plate, a light shutter, and a light source. The front plate has a plurality of light scattering members that generate diffused light and a planarizing film formed so as to cover the light scattering members.

The light scattering members include a red phosphor that converts blue light to red light, a green phosphor that converts blue light to green light, and a blue light scattering member that scatters blue collimated light.

The bottom of the red phosphor is open, and a reflective film is formed so as to surround the peripheral surface of the red phosphor.

RELATED ART DOCUMENTS

Patent Documents

Patent Document 1: Japanese Patent Application Laid-Open Publication No. 2000-131683
Patent Document 2: Japanese Patent Application Laid-Open Publication No. 2003-5182
Patent Document 3: Japanese Patent Application Laid-Open Publication No. 2010-66437

SUMMARY OF THE INVENTION

Problems to be Solved by the Invention

The display device described in Japanese Patent Application Laid-Open Publication No. 2010-66437, for example, requires that the phosphors and the light scattering members be respectively formed by photolithography, thus increasing the amount of manufacturing steps.

A method to solve this problem includes forming frame-shaped boundary parts in advance and coating the phosphor material and diffusion material through ink jet deposition, for example. Reflective parts are formed on the peripheral surface of these boundary parts. With this method, the phosphors and the light scattering members can be formed together by ink jet deposition after the boundary parts have been formed, thereby allowing for the manufacturing process to be simplified.

The reflective parts used in this method are formed along the peripheral surface of the boundary parts. Therefore, there is a risk that the peripheral surface of the boundary parts and the shape of the reflective parts could cause large deviations in the intensity distribution of light emitted from the phosphors and light scattering members.

The present invention was made in view of the above-mentioned problems, and aims at providing a color conversion substrate and a liquid crystal display device having a simplified manufacturing process and reduced deviations in the intensity distribution of emitted light.

Means for Solving the Problems

A color conversion substrate according to the present invention includes a transparent substrate having a main surface; a phosphor layer disposed on the main surface of the transparent substrate, the phosphor layer having a plurality of phosphors arranged along the main surface and a plurality of first transparent boundary parts formed so as to surround the respective phosphors; and a plurality of first reflective parts formed on a peripheral surface of the respective first transparent boundary parts, wherein a portion of each of the first transparent boundary parts attached to the respective first reflective parts is a curved surface, and wherein a curvature of the curved surface of the respective first transparent boundary parts is $0.50/d1$ to $0.83/d1$, where d1 is a thickness of the respective first transparent boundary parts.

It is preferable that a portion of the peripheral surface of the respective first transparent boundary parts contacting the main surface of the transparent substrate form an angle to the main surface that is 60° to 80°.

It is preferable that a cross-sectional area of each of the phosphors become progressively smaller from a bottom to a top thereof, the bottom being a first phosphor surface facing the main surface of the transparent substrate and the top being a second phosphor surface on a side opposite to the first phosphor surface, and preferable that the first reflective parts each include a lateral protrusion that extends from the peripheral surface of the respective first transparent boundary parts to above the second phosphor surface of the respective phosphors.

It is preferable that the phosphor layer further include a plurality of diffusion members and a plurality of second transparent boundary parts formed so as to surround the respective diffusion members, and preferable that the phosphor layer further include second reflective parts formed on a peripheral surface of the respective second transparent boundary parts. It is preferable that a portion of each of the second transparent boundary parts attached to the respective second reflective parts be a curved surface, and preferable that a curvature of the curved surface of the respective second transparent boundary parts be $0.50/d2$ to $0.83/d2$, where d2 is a thickness of the respective second transparent boundary parts.

It is preferable that the color conversion substrate further include a low refractive index layer interposed between the phosphor layer and the main surface of the transparent substrate, and preferable that a refractive index of the low refractive index layer be less than a refractive index of the respective phosphors.

A liquid crystal display device according to the present invention has the above-mentioned color conversion substrate. This liquid crystal display device includes a thin film transistor substrate; an opposite substrate having the color conversion substrate, the opposite substrate being disposed on the thin film transistor substrate with a gap therebetween; and a liquid crystal layer provided in the gap between the thin film transistor substrate and the opposite substrate, wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

It is preferable that a planarizing film be provided between the color conversion substrate and the polarization film, and preferable that a portion of the planarizing film adjacent to the polarization film have a planarized surface. It is preferable that a refractive index of the planarizing film be less than a refractive index of the respective phosphors.

Effects of the Invention

The color conversion substrate and the liquid crystal display device of the present invention make it possible to suppress the occurrence of deviations in the intensity distribution of emitted light.

BRIEF DESCRIPTION OF THE DRAWINGS

FIG. 9 is a cross-sectional view of the configuration of a boundary part 18B and the periphery thereof.

FIG. 10 is a cross-sectional view of the first step of the manufacturing process of the color conversion substrate 4.

DETAILED DESCRIPTION OF EMBODIMENTS

Embodiment 1

Figure 1:
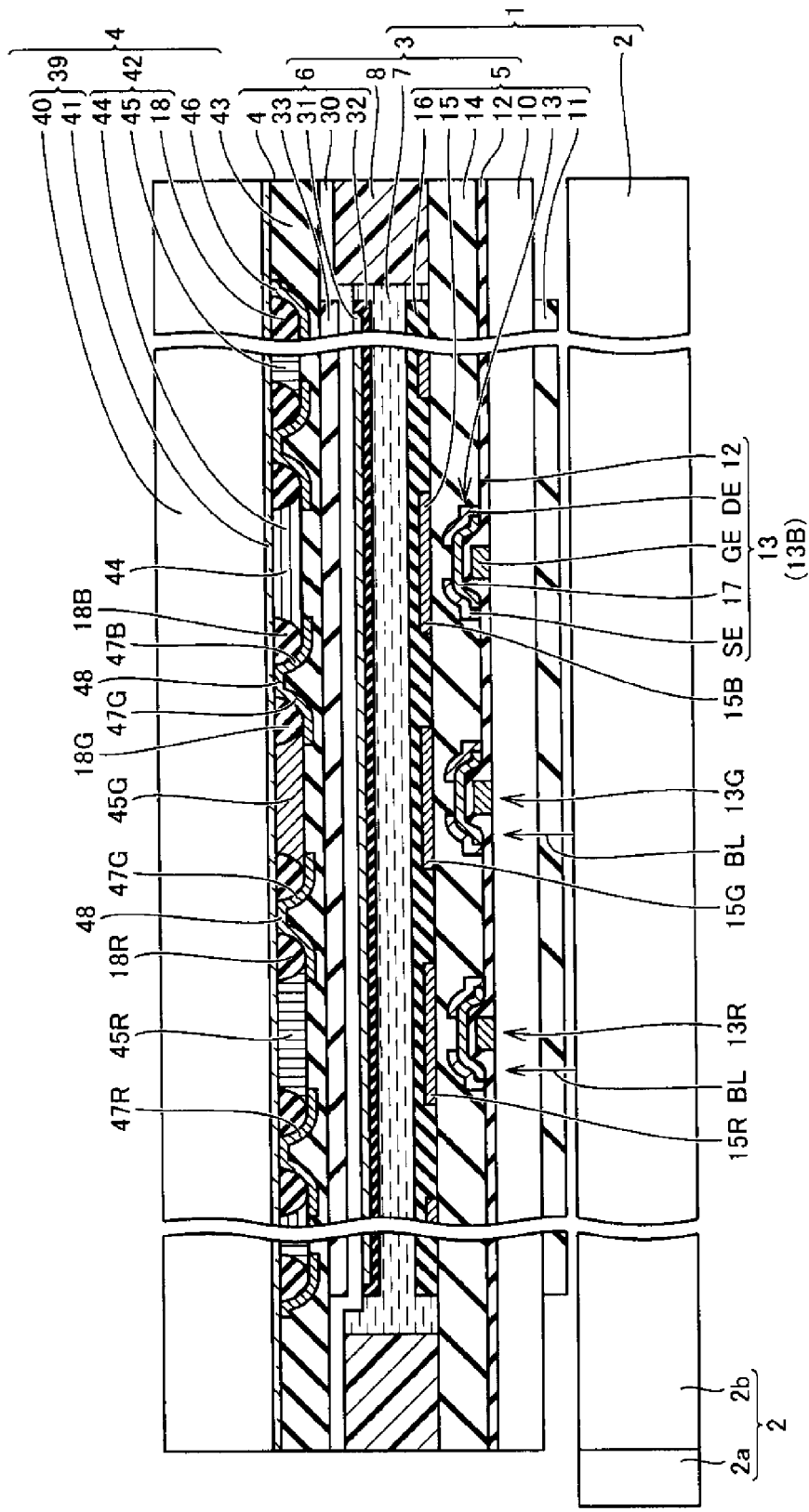
FIG. 1 is a cross-sectional view of a display device 1 according to Embodiment 1.

FIG. 1 is a cross-sectional view of a display device 1 related to Embodiment 1. As shown in FIG. 1, the display device 1 includes a light source module 2 and a liquid crystal module 3.

The light source module 2 is provided with a light guide plate 2b, a plurality of LEDs (light emitting diodes) 2a provided on a side face of the light guide plate 2b, and the like, for example. The light source module 2 is a surface light-emitting unit that radiates blue light BL towards the liquid crystal module 3. The light source module 2 is not limited to an edge-lit backlight like the one described above. The light source module 2 may be a direct-lit type provided with a plurality of LEDs 2a arranged in an array, for example. The wavelength region of the blue light BL is 390 nm to 510 nm, for example. The wavelength in which the intensity of the blue light BL is highest is approximately 450 nm, for example. In the present embodiment, an example is described in which blue light is used, but ultraviolet rays may be used as the light emitted by the light source module 2. An example that uses ultraviolet rays will be described later.

The liquid crystal module 3 includes a TFT (thin film transistor) substrate 5 disposed near the light source module 2, an opposite substrate 6 disposed closer to the opposite side of the light source module 2 than the TFT substrate 5, a liquid crystal layer 7 sealed between the TFT substrate 5 and the opposite substrate 6, and a sealing member 8 that seals the liquid crystal layer 7.

The TFT substrate 5 includes a transparent substrate 10 such as a glass substrate, a polarizing plate 11 formed on the transparent substrate 10 on a main surface thereof that faces the light source module 2, a plurality of TFT transistors 13 formed on the transparent substrate on a main surface thereof on a side opposite to the main surface where the polarizing plate 11 is formed, an interlayer insulating film 14 formed so as to cover the TFT transistors 13, a pixel electrode 15 formed on the interlayer insulating film 14, and an alignment film 16 that is formed so as to cover the pixel electrode 15.

The polarizing plate 11 is formed by dyeing a polyvinyl alcohol (PVA)-based film with iodine or a dichroic dyestuff and stretching this film, for example. Each of the TFT transistors 13 includes a gate electrode GE formed on the main surface of the transparent substrate 10, a gate insulating film 12 formed so as to cover this gate electrode GE, a semiconductor layer 17 formed on this gate insulating film 12, and a source electrode SE and a drain electrode DE formed with a gap therebetween on this semiconductor layer 17. The gate insulating film 12 is a transparent insulating film such as a silicon oxide film or a silicon nitride film.

The interlayer insulating film 14 is a transparent insulating film such as a silicon oxide film or a silicon nitride film.

The pixel electrode 15 is formed of a transparent conductive film such as an ITO (indium tin oxide) film, an IZO (indium zinc oxide) film, or the like, for example. The pixel electrode 15 is connected to the drain electrode DE by a contact (not shown). Thus, when the TFT transistor 13 is in an ON state, a prescribed voltage is applied to the pixel electrode 15.

A plurality of the TFT transistors 13 are provided, and in the example shown in FIG. 1, TFT transistors 13R, 13G, and 13B are provided. A plurality of each of the TFT transistors 13R, 13F, and 13B are provided.

Furthermore, the TFT transistors 13R, 13G, and 13B are respectively connected to pixel electrodes 15R, 15G, and 15B.

The alignment film 16 is formed of a polyimide film or the like, and a rubbing treatment is performed on the surface thereof so that the orientation of the liquid crystal molecules can be controlled. The liquid crystal layer 7 includes a plurality of liquid crystal molecules.

The opposite substrate 6 includes the color conversion substrate 4, a polarizing plate 33 formed on the bottom of the color conversion substrate 4, a transparent insulating film 30 formed on the bottom of this polarizing plate 33, an opposite electrode 31 formed on the bottom of this transparent insulating film 30, and an alignment film 32 formed so as to cover this opposite electrode 31. The polarizing plate 33 is made of a wire grid formed by a conductive material such as aluminum, at least one type of dichroic dyestuff (TCF made by OPTVA, for example), or the like, for example.

In the present embodiment, the color conversion substrate 4 is included in the opposite substrate 6, and the components of the color conversion substrate and the components of the opposite substrate such as the polarizing plate and opposite electrode are stacked on a transparent substrate 40.

Therefore, it is possible to omit one transparent substrate, such as a glass substrate, as compared to if a glass substrate were used for the opposite substrate and another glass substrate were used for the color conversion substrate and these were stacked together, for example. Therefore, it is possible for the liquid crystal module 3 to be thinner.

The color conversion substrate 4 includes a main plate 39 having an emitting surface, a phosphor layer 42 formed on a main surface of the main plate 39 opposite to the emitting surface thereof, a reflective member 46 formed on the phosphor layer 42, and a planarizing film 43 formed between the phosphor layer 42 and the polarizing plate 33. The main plate 39 includes the transparent substrate 40 and a low refractive index layer 41 formed on the main surface of the transparent substrate 40. The transparent substrate 40 is a glass substrate, or the like, for example. The refractive index of the low refractive index layer 41 is 1.20 to 1.40, for example. The thickness of the low refractive index layer 41 is 0.5 μm to 3.0 μm. It is preferable that the thickness be 1.0 μm to 1.5 μm.

The phosphor layer 42 includes a plurality of light scattering members 44, a plurality of phosphors 45, and boundary parts 18 formed so as to surround the light scattering members 44 and the phosphors 45. There phosphors include a red phosphor 45R and a green phosphor 45G. The red phosphor 45R, the green phosphor 45G, and the light scattering member 44 are disposed so as to have gaps therebetween.

The refractive index of the red phosphor 45R and the green phosphor 45G is approximately 1.49 to 1.59. The thickness of the red phosphor 45R and the green phosphor 45G is 2 μm to 10 μm. It is preferable that the thickness be 5 μm to 8 μm. The red phosphor 45R and the green phosphor 45G are formed of an organic fluorescent material, a nanofluorescent material, or the like. Examples of the organic phosphor materials include a rhodamine pigment such as rhodamine B that is a red phosphor pigment, a coumarin pigment such as coumarin 6 that is a green phosphor pigment, or the like. The nanophosphor material includes a binder and a plurality of phosphors diffused in the binder. The binder is formed of a resin such as a transparent silicone type, an epoxy type, or an acrylic type, for example. CdSe, ZnS, or the like that is a nanoparticle phosphor can be used as the phosphor, for example. By forming the red phosphor 45R using a material mentioned above, the red phosphor 45R can allow red light (light with a wavelength region of 530 nm to 690 nm) to pass therethrough. As a result, the light emitted by exciting the red phosphor 45R can pass through the red phosphor 45R, and thus an improvement in light use efficiency of the light emitted by the red phosphor 45R is possible.

In a similar manner, the green phosphor 45G can allow green light to pass therethrough and the light emitted by exciting the green phosphor 45G can pass through the green phosphor 45G, and thus an improvement in light use efficiency of the light emitted by the green phosphor 45G is possible.

The light scattering member 44 is a layer that diffuses light entering therein and then emits the light to outside. The thickness of the light scattering member 44 is 3 μm to 15 μm, for example. It is preferable that the thickness be 5 μm to 10 μm. The light scattering member 44 includes a transparent resin as the binder, and a plurality of scattering particles (fillers) that scatter light in the resin, for example. The transparent resin that is a binder allows blue light BL to pass therethrough and allows light use efficiency to be improved. Examples of the scattering particles include filler materials subject to Mie scattering such as $TiO_2$.

The planarizing film 43 is made of a material that has a lower refractive index than the light scattering member 44, the red phosphor 45R, and the green phosphor 45G.

The boundary part 18 includes a boundary part 18R formed so as to surround the peripheral surface of the red phosphor 45R, a boundary part 18G formed so as to surround the peripheral surface of the green phosphor 45G, and a boundary part 18B formed so as to surround the peripheral surface of the light scattering member 44. The boundary part 18 is made of a transparent resin or the like that allows light to pass therethrough.

The reflective member 46 includes a reflective part 47R formed on the boundary part 18R, a reflective part 47G formed on the boundary part 18G, a reflective part 47B formed on the boundary part 18B, and connection parts 48 formed so as to connect the respective reflective parts 47R, 47G, and 47B.

The connection part 48 is formed on the low refractive index layer 41 located between the boundary part 18R and the boundary part 18G, between the boundary part 18G and the boundary part 18B, and between the boundary part 18B and the boundary part 18R.

Examples of the reflective member 46 include materials having a high reflectance of visible light, such as aluminum, silver, or an alloy thereof, for example. When using aluminum (Al) as the metal for the reflective member 46, for example, the film thickness of the reflective member 46 is 100 nm to 500 nm, for example. It is preferable that the film thickness be 200 nm to 300 nm.

The sealing member 8 is formed along the periphery of the TFT substrate 5 and the opposite substrate 6 in a loop shape, and the liquid crystal layer 7 is sealed between the color conversion substrate 6 and the TFT substrate 5.

Figure 2:
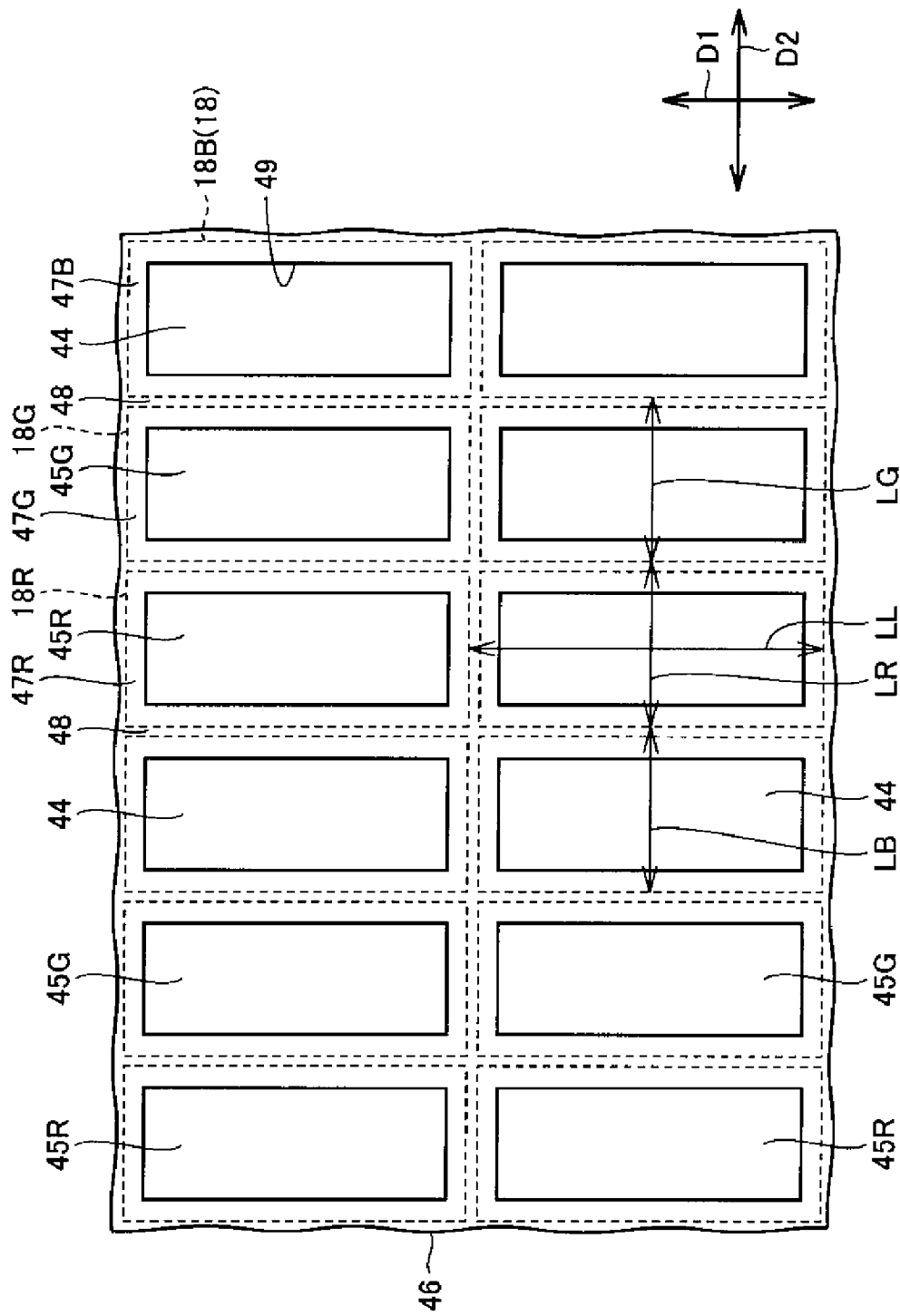
FIG. 2 is a plan view of a color conversion substrate 4 in FIG. 1.

FIG. 2 is a plan view of the color conversion substrate 4 in FIG. 1. FIG. 2 is a plan view of the color conversion substrate 4 when seen from the light source module 2 side.

As shown in FIG. 2, a plurality of the red phosphors 45R are arranged in an array direction D1 with gaps therebetween, and in a similar manner, a plurality of the green phosphors 45G are arranged in the array direction D1. The light scattering members 44 are also arranged in the array direction D1 with gaps therebetween.

The red phosphors 45R, the green phosphors 45G, and the light scattering members 44 are sequentially arranged in an array direction D2 with gaps therebetween. A length LL shown in FIG. 2 is 30 μm to 900 μm, for example. Lengths LB, LR, and LG are approximately 30 μm to 300 μm, for example. The lengths LB, LR, and LG do not need to be equal.

In this manner, the plurality of red phosphors 45R, green phosphors 45G, and light scattering members 44 are arranged in arrays, and the looped boundary parts 18R, 18G, and 18B are formed so as to surround these plurality of red phosphors 45R, green phosphors 45G, and light scattering members 44. The reflective member 46 is formed on the boundary parts 18R, 18G, and 18B.

Figure 3:
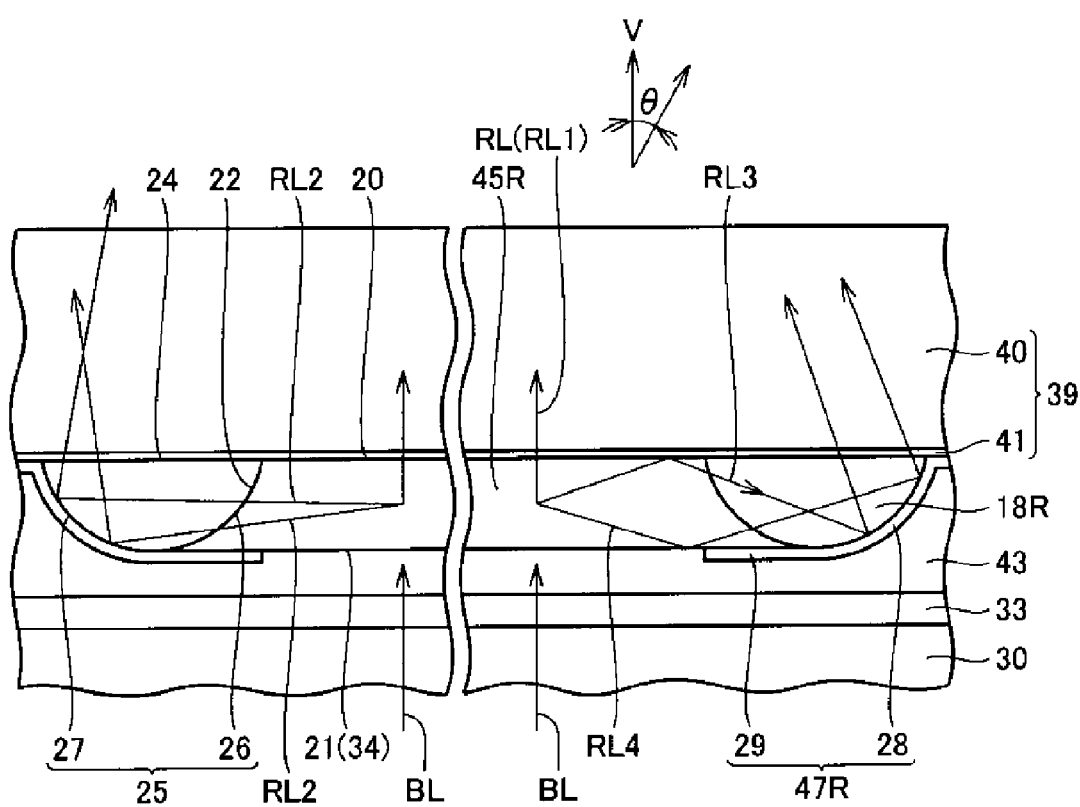
FIG. 3 is a cross-sectional view of the structure of a red phosphor 45R and the periphery thereof.

FIG. 3 is a cross-sectional view of the structure of the red phosphor 45R and the periphery thereof. As shown in FIG. 3, the red phosphor 45R has an emitting surface 20 that is opposite to the main surface of the transparent substrate 40, a bottom surface 21 on a side opposite to the emitting surface 20, and a peripheral surface 22 located between the emitting surface 20 and the bottom surface 21.

The boundary part 18R is formed in a loop shape that surrounds the peripheral surface 22. The boundary part 18R includes an opposite surface 24 that is opposite to the main surface of the emitting surface 20, and a peripheral surface 25.

The peripheral surface 25 includes an outer peripheral surface 27 and an inner peripheral surface 26 in contact with the peripheral surface 22 of the red phosphor 45R. The outer peripheral surface 27 and the inner peripheral surface 26 are formed in a curved shape.

The width of the red phosphor 45R becomes progressively smaller from the bottom surface 21 to the emitting surface 20.

The reflective part 47R includes a side wall 28 formed on the outer peripheral surface 27, and a protrusion 29 connected to the end of the side wall 28 and formed on the bottom surface 21 of the red phosphor 45R. The protrusion 29 is formed in a loop shape. A light receiving surface 34 is formed by a portion of the bottom surface 21 being exposed from the protrusion 29. The protrusion 29 is formed so as to face the peripheral surface 22 of the red phosphor 45R and the thickness direction of the red phosphor 45R. The thin portions of the red phosphor 45R are covered by the protrusion 29.

Figure 4:
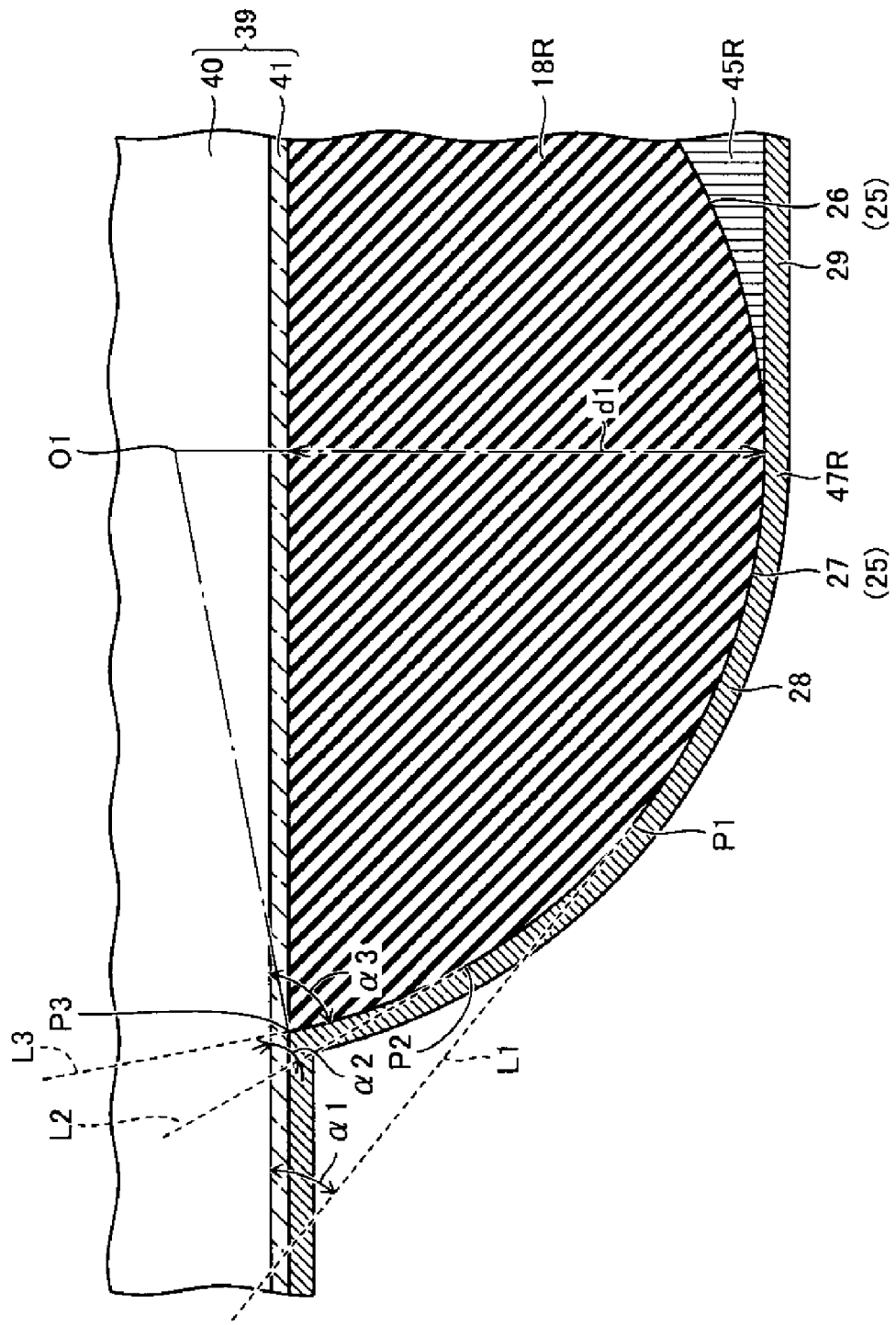
FIG. 4 is a cross-sectional view of the configuration of a reflective part 47R and the periphery thereof.

FIG. 4 is a cross-sectional view of the configuration of the reflective part 47R and the periphery thereof. In FIG. 4, the outer peripheral surface 27 of the boundary part 18R is formed so as to be curved.

A first location P1 in FIG. 4 is any location on the outer peripheral surface 27. A second location P2 is a location that is closer to the main surface of the transparent substrate 40 than the first location P1. A top end P3 is the location closest to the main surface of the transparent substrate 40 of the outer peripheral surface 27.

L1 is a tangent line at the first location P1, and L2 is a tangent line at the second location P2. In a similar manner, L3 is a tangent line at the top end P3.

The intersection angle of the main surface of the transparent substrate 40 and the tangent line L1 is α1, and the intersection angle of the main surface of the transparent substrate 40 and the tangent line L2 is α2. The intersection angle of the main surface of the transparent substrate 40 and the tangent line L3 is α3. The intersection angle α1 and the like implies an angle of the main surface of the transparent substrate 40 to the tangent line L1 and the like that is less than 90°.

As is clear in FIG. 4, the intersection angle α1 is smaller than the intersection angle α2, and the intersection angle α3 is larger than the intersection angle α2. In this manner, the outer peripheral surface 27 is formed in a curved shape such that the intersection angle of the outer peripheral surface 27 to the main surface of the transparent substrate 40 becomes progressively larger approaching the main surface of the transparent substrate 40.

Specifically, the outer peripheral surface 27 is formed in an arc-shape that has a curvature center O1 at the center thereof. If the thickness of the boundary part 18R is d1, then the curvature of the outer peripheral surface 27 is 0.50/d1 to 0.83/d1. When the outer peripheral surface 27 is formed so as to have this type of curvature, the intersection angle α3 is 60° to 80°. It is preferable that the curvature of the outer peripheral surface 27 be 0.66/d1. The curvature of the outer peripheral surface 27 does not need to be uniform across the entire surface.

The side wall 28 of the reflective part 47R is formed on the outer peripheral surface 27, and the inner peripheral surface of the side wall 28 is formed in a manner similar to the outer peripheral surface 27.

The operation of the display device 1 with this type of configuration will be described. In FIG. 1, the blue light BL from the light source module 2 enters the liquid crystal module 3. The liquid crystal module 3 selectively allows the blue light BL to enter the color conversion substrate 4 disposed on the liquid crystal module 3. Specifically, when the selected TFT transistor 13 is ON, only the blue light BL passing through the pixel electrode 15 connected to the selected TFT transistor 13 travels through the polarizing plate 33 and enters the color conversion substrate 4.

In FIG. 3, the protrusion 29 is formed so as to cover the portion of the red phosphor 45R below the inner peripheral surface 26 of the boundary part 18B. Therefore, the protrusion 29 suppresses the blue light BL from entering the thin portions of the red phosphor 45R. By suppressing the blue light BL from entering the thin portions of the red phosphor 45R, it is possible to suppress the blue light BL that has entered from passing through the red phosphor 45R.

The red phosphor 45R is thick at the light receiving surface 34, and thus, even if the blue light BL enters, the blue light BL can be suppressed from passing through the red phosphor 45R. When the blue light BL enters from the light receiving surface 34, the red phosphor 45R becomes excited and radially emits red light RL. Red light RL1, for example, travels towards the low refractive index layer 41. If the angle of incidence of the red light RL1 is less than the critical angle of the interface of the red phosphor 45R and the low refractive index layer 41, the red light RL1 enters inside the low refractive index layer 41 and exits to outside from the emitting surface of the transparent substrate 40.

Meanwhile, as shown by red light RL3, when the angle of incidence of the red light RL3 at the interface of the low refractive index layer 41 and the red phosphor 45R is greater than the critical angle of the red phosphor 45R and the low refractive index layer 41, the light is reflected at this interface. The red light RL3 reflected at the interface of the low refractive index layer 41 and the red phosphor 45R in this manner enters to inside of the boundary part 18B and is then reflected at the side wall 28 of the reflective part 47R. The red light RL3 then travels towards the low refractive index layer 41. When the red light RL3 is incident on the interface of the low refractive index layer 41 and the red phosphor 45R, if the angle of incidence of the red light RL3 is greater than the critical angle, then the red light RL3 enters the low refractive index layer 41 and exits to outside from the emitting surface of the transparent substrate 40.

Red light RL4 is the emitted red light RL traveling towards the light receiving surface 34. The refractive index of the planarizing film 43 is lower than the refractive index of the red phosphor 45R. Therefore, if the angle of incidence of the red light RL4 at the interface of the planarizing film 43 and the red phosphor 45R is large, then the red light RL4 will be reflected at this interface. The red light RL4 reflected at the interface of the planarizing film 43 and the red phosphor 45R is then reflected at the side wall 28 of the reflective part 47R.

The red light RL4 reflected at the reflective part 47R is reflected towards the low refractive index layer 41. If the angle of incidence of the red light RL4 at this time is less than the critical angle of the interface of the low refractive index layer 41 and the red phosphor 45R, then the red light RL4 passes through the low refractive index layer 41 and exits to outside from the emitting surface of the transparent substrate 40.

Among the red light RL, the red light RL2 heading towards the peripheral surface 22 is also reflected at the side wall 28 of the reflective part 47R. The red light RL2 reflected at the side wall 28 of the reflective part 47R travels towards the interface of the low refractive index layer 41 and the red phosphor 45R. At this time, if the angle of incidence of the red light RL2 is less than the critical angle of the interface of the low refractive index layer 41 and the red phosphor 45R, then the red light RL2 passes through the low refractive index layer 41 and exits to outside from the emitting surface of the transparent substrate 40.

In this manner, the emitted red light RL is reflected by the side wall 28 of the reflective part 47R. At this time, the side wall 28 of the reflective part 47R has a curved surface as described above. Thus, the reflectance angle of the red light RL changes depending on the location where the red light RL is incident on reflective part 47R. Following this, the red light RL can be suppressed from being reflected in a particular direction.

Figure 5:
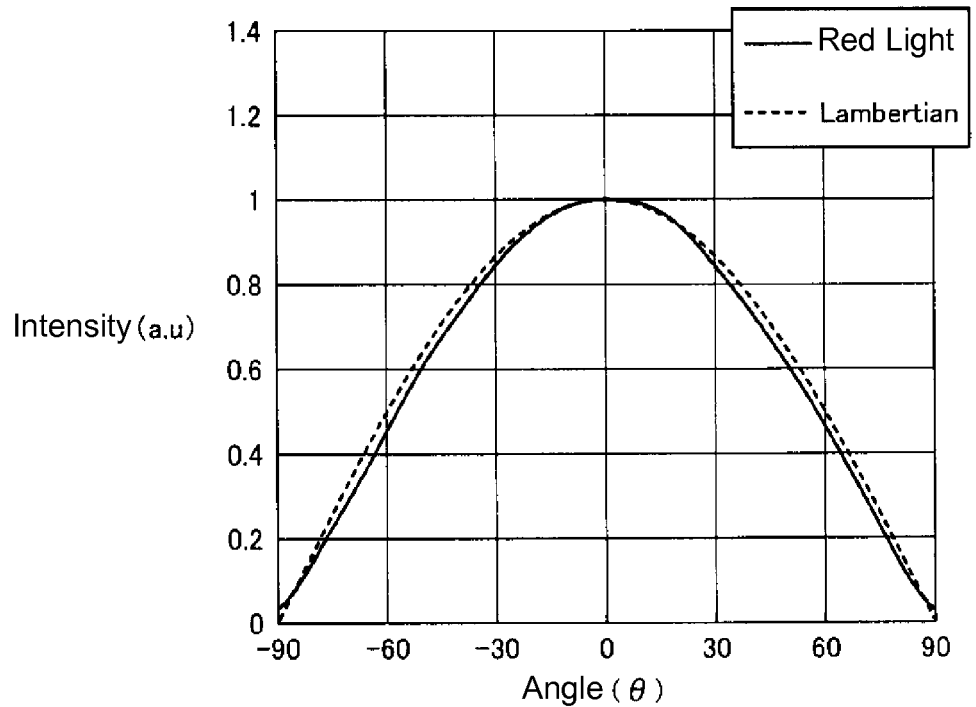
FIG. 5 is a graph of the intensity distribution of red light RL shown in FIG. 3.

FIG. 5 is a graph of the intensity distribution of the red light RL shown in FIG. 3. In FIG. 5, the horizontal axis is the emitting angle θ (°) of the red light RL. In FIG. 3, the direction perpendicular to the emitting surface of the transparent substrate 40 is a reference direction V. The emitting angle θ (°) shows the angle of the reference direction V to the emitting direction of the red light RL. The vertical axis in FIG. 5 shows the intensity of the red light RL.

The graph in FIG. 5 shows the results of orientation characteristics being simulated on the basis of the following parameters in the display device 1 of the present embodiment. The ratio of the thickness of the red phosphor 45R to the opening width of the light receiving surface 34 is 1:9. The intersection angle α3 of the transparent substrate 40 and the outer peripheral surface 27 of the boundary part 18R is 70°, and the refractive index of the low refractive index layer is 1.21. The direction normal to the transparent substrate 40 is 0°.

Under these parameters, the orientation characteristics of the red light RL of the display device 1 according to the present embodiment have characteristics that are close to Lambertian characteristics. This reduces changes in intensity that differ depending on the viewing angles and improves display quality.

The orientation characteristics described above are due to the shape of the side wall 28 of the reflective part 47R shown in FIG. 3.

The red phosphor 45R was described above, but the green phosphor 45R also has the reflective part 47G formed in a similar manner, and thus has orientation characteristics that are similar to the red phosphor 45R. This makes it so that the brightness of displayed images is substantially uniform regardless of the viewing angle of the viewer.

Figure 6:
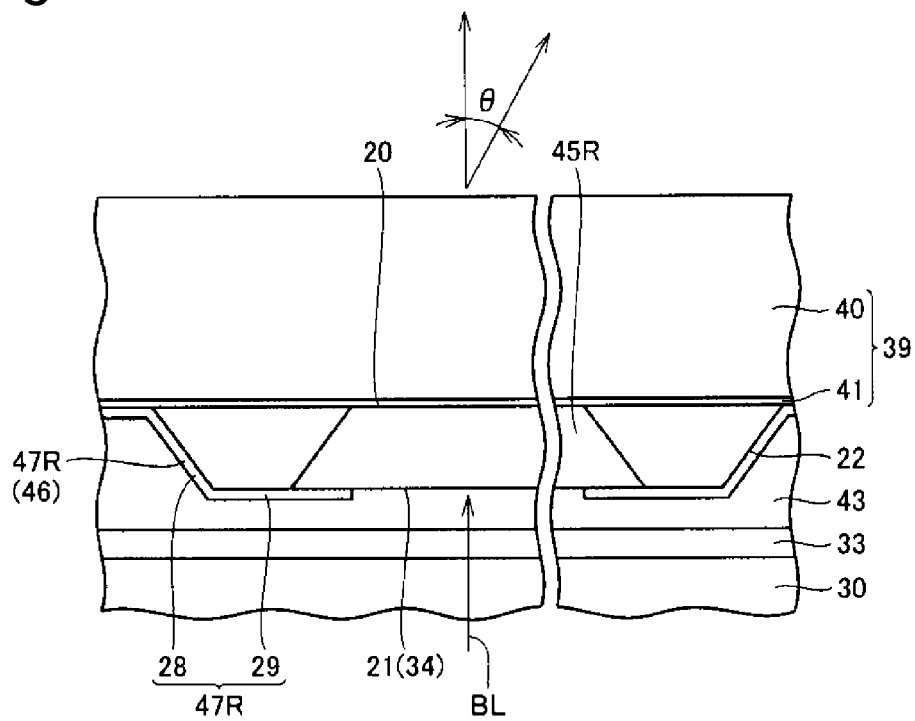
FIG. 6 is a cross-sectional view of a portion of a display device according to a comparison example.
Figure 7:
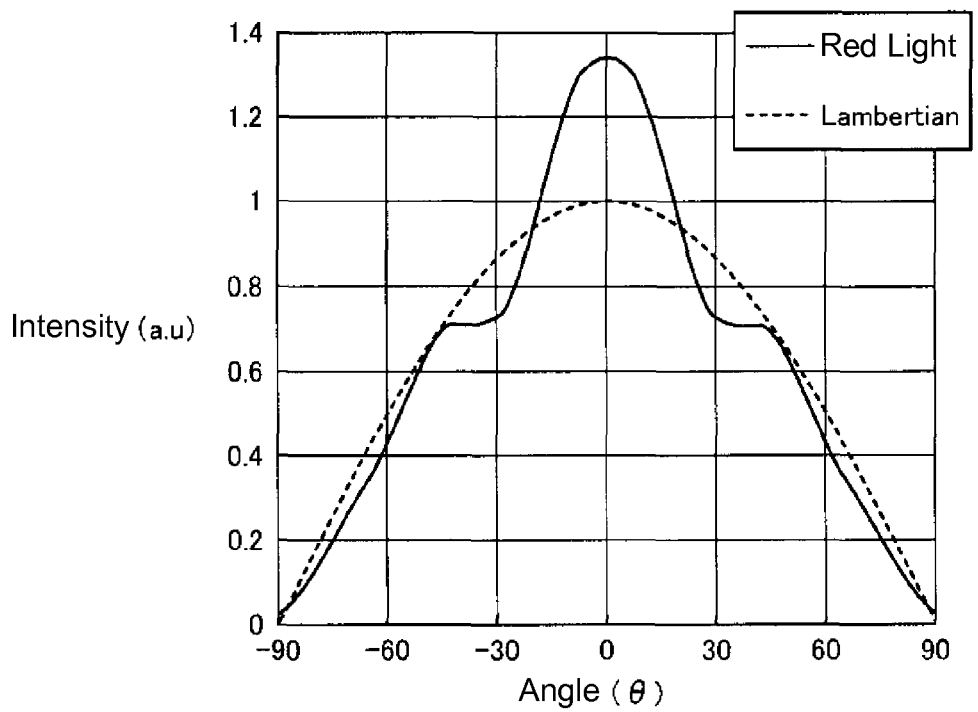
FIG. 7 is a graph of orientation characteristics of a red phosphor 45R in a simulation in the comparison example shown in FIG. 6.

Next, FIGS. 6 and 7 will be used to explain a configuration of the display device 1 according to a comparison example and the orientation characteristics of light of the display device 1.

FIG. 6 is a cross-sectional view of a portion of a display device according to the comparison example. In the example shown in FIG. 6, the peripheral surface 22 of the red phosphor 45R is a slanted surface, and the side wall 28 of the reflective part 47R is also formed in a slanted shape. In other words, the angle of the tangent line at any location on the side wall 28 of the reflective part 47R to the main surface of the transparent substrate 40 is uniform.

The graph in FIG. 7 shows the orientation characteristics of the red phosphor 45R in the comparison example in FIG. 6 that has been simulated on the basis of the following parameters. The ratio of the thickness of the red phosphor 45R layer to the opening width is 1:9. The angle of the transparent substrate 40 to the top end of the peripheral surface of the red phosphor 45R is 70°, and the refractive index of the low refractive index layer 41 is 1.21. The refractive index of the reflective part 47R is 90%. The direction normal to the transparent substrate 40 is 0°.

Under these parameters, as shown in FIG. 7, the orientation characteristics of the red phosphor 45R of the comparison example have a marked peak when the emitting angle θ (°) is around 0°, and the intensity rapidly changes to a very small amount in the ±30° direction. Therefore, this is a significant deviation from Lambertian characteristics. In other words, the screen would appear very bright when viewed from a particular angle, and dark when viewed from another angle.

In this manner, in the display device 1 in the present embodiment, the slant angle of the reflective part 47R is made to differ depending on the location to make it possible to obtain the Lambertian characteristics shown in FIG. 5.

In the present embodiment, the entirety of the outer peripheral surface 27 is formed so as to be curved, but at least a portion of the outer peripheral surface 27 may be curved. The reflective part 47R is formed at least on the curved portion of the outer peripheral surface 27.

Figure 8:
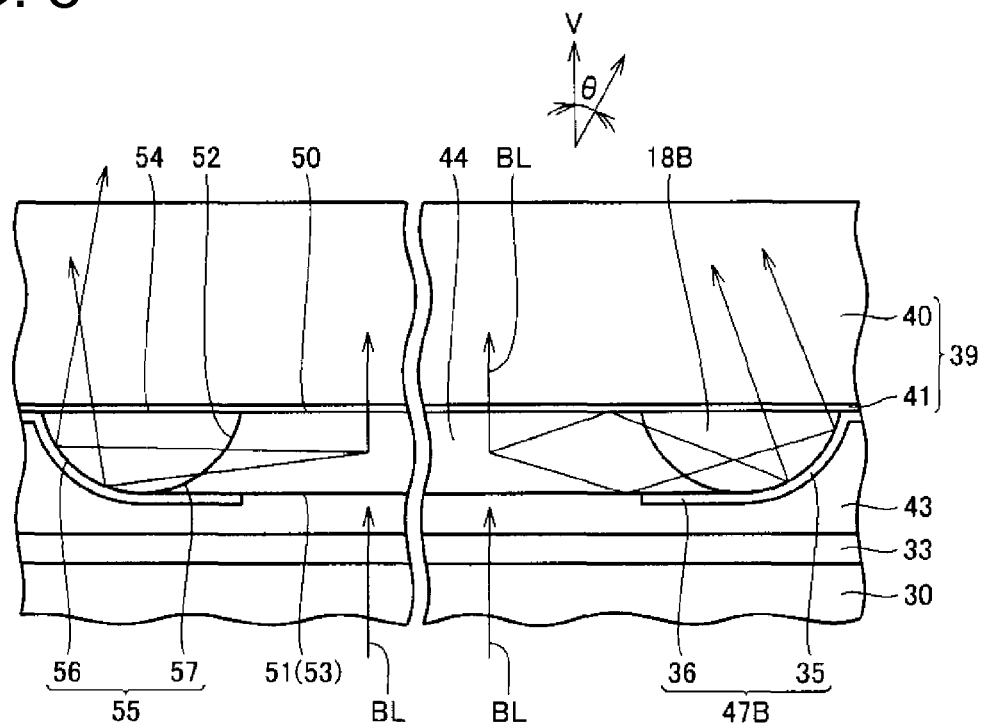
FIG. 8 is a cross-sectional view of the configuration of a light scattering member 44 and the periphery thereof.

FIG. 8 is a cross-sectional view of the configuration of the light scattering member 44 and the periphery thereof. As shown in FIG. 8, the light scattering member 44 includes an emitting surface 50 that faces the main surface of the transparent substrate 40, a bottom surface 51 disposed on a side opposite to the emitting surface 50, and a peripheral surface 52 located between the emitting surface 50 and the bottom surface 51.

The boundary part 18B also includes an opposite surface 54 that is opposite to the main surface of the transparent substrate 40, and a peripheral surface 55. The peripheral surface 55 includes an outer peripheral surface 56 and an inner peripheral surface 57. The inner peripheral surface 57 is in contact with the peripheral surface 52 of the light scattering member 44.

The reflective member 47B includes a side wall 35 formed on the outer peripheral surface 56, and a protrusion 36 connected to the side wall 35 and formed on the bottom surface 51 of the light scattering member 44.

The protrusion 36 is formed in a loop shape and the portion of the bottom surface 51 exposed from the protrusion 36 is a light receiving surface 53 of the light scattering member 44.

The protrusion 36 faces the inner peripheral surface 57 of the boundary part 18B and covers the thin portion of the light scattering member 44. Due to this, the blue light BL is suppressed from entering the thin portion of the light scattering member 44, and the blue light BL that has entered is suppressed from passing through the light scattering member 44.

If the blue light BL enters the light scattering member 44, the blue light BL in the light scattering member 44 is scattered and enters inside the main plate 39 from the emitting surface 50, thereafter exiting to outside.

At this time, the low refractive index layer 41 is between the transparent substrate 40 and the light scattering member 44; therefore, if the angle of incidence of the blue light BL incident at the interface of the low refractive index layer 41 and the light scattering member 44 is less than the critical angle of the low refractive index layer 41 and the light scattering member 44, then the blue light BL is reflected at this interface. Of the blue light BL at the interface of the low refractive index layer 41 and the light scattering member, only the blue light BL having an angle of incidence that is less than the critical angle will enter the low refractive index layer 41 and then exit to outside.

The refractive index of the planarizing film 43 is less than the refractive index of the light scattering member 44. Thus, the blue light BL that is scattered inside the light scattering member 44 is suppressed from entering inside the planarizing film 43. Therefore, it is possible to improve the light use efficiency of the blue light BL.

FIG. 9 is a cross-sectional view of the configuration of the boundary part 18B and the periphery thereof. A fourth location P4 in FIG. 9 is a location on the outer peripheral surface 56. A fifth location P5 is a location that is closer to the main surface of the transparent substrate 40 than the fourth location P4. A top end P6 is the top end of the outer peripheral surface 56.

L4 is a tangent line passing through the fourth location P4, and L5 is a tangent line passing through the fifth location P5. In a similar manner, L6 is a tangent line at the top end P6. An intersection angle of the tangent line L4 to the main surface of the transparent substrate 40 is α4, and an intersection angle of the tangent line L5 to the main surface of the transparent substrate is α5. The intersection angle of the main surface of the transparent substrate 40 and the tangent line L6 is α6.

As is clear from FIG. 9, the outer peripheral surface 56 is formed in a curved shape such that the intersection angle α5 is greater than the intersection angle α4. The intersection angle α6 is greater than the intersection angle α5. The reflective part 47B is formed on the outer peripheral surface 56 that has the curved shape formed in this manner, and the inner peripheral surface of the sidewall 35 of the reflective part 47B is also curved, in a manner similar to the outer peripheral surface 56. If the thickness of the boundary part 18B is d2, then the curvature of the outer peripheral surface 56 is 0.50/d2 to 0.83/d2. When the outer peripheral surface 56 is formed so as to have this type of curvature, the intersection angle α6 is 60° to 80°. It is preferable that the curvature of the outer peripheral surface 56 be 0.66/d2. The curvature of the outer peripheral surface 56 does not need to be uniform across the entire surface.

In the present embodiment, the entirety of the outer peripheral surface 56 of the boundary part 18B is formed so as to be curved, but a portion of the outer peripheral surface 56 may be formed so as to be curved. In this case, the reflective part 47B is formed on at least the curved portion.

Next, a method of manufacturing the display device 1 shown in FIG. 1 will be explained. The liquid crystal module 3 and the light source module 2 are combined together when manufacturing the display device 1. The liquid crystal module 3 can be manufactured by bonding the individually manufactured TFT substrate 5 and opposite substrate 6 to each other and sealing the liquid crystal layer 7 therebetween with the sealing member 8. The opposite substrate 6 can be manufactured by sequentially forming the color conversion substrate 4, the polarizing plate 33, the transparent insulating film 30, the electrode 31, and the alignment film 32. Next, the method of manufacturing the color conversion substrate 4 will primarily be explained.

FIG. 10 is a cross-sectional view showing the first step of the manufacturing process of the color conversion substrate 4. As shown in FIG. 10, a transparent substrate 60 having a main surface is prepared.

Figure 11:
FIG. 11 is a cross-sectional view of the step after the manufacturing step in FIG. 10.
Figure 12:
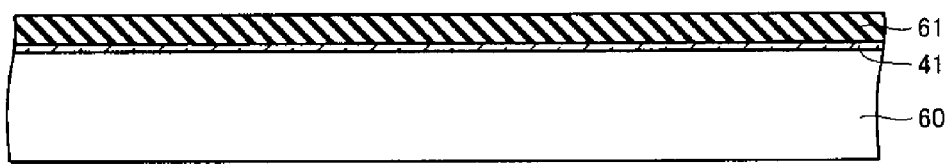
FIG. 12 is a cross-sectional view of the step after the manufacturing step in FIG. 11.

Next, as shown in FIG. 11, the low refractive index layer 41 is formed on the main surface of the transparent substrate 60 by spin coating, slit coating, or the like. Next, as shown in FIG. 12, a resist layer 61 is formed on the low refractive index layer 41.

Figure 13:
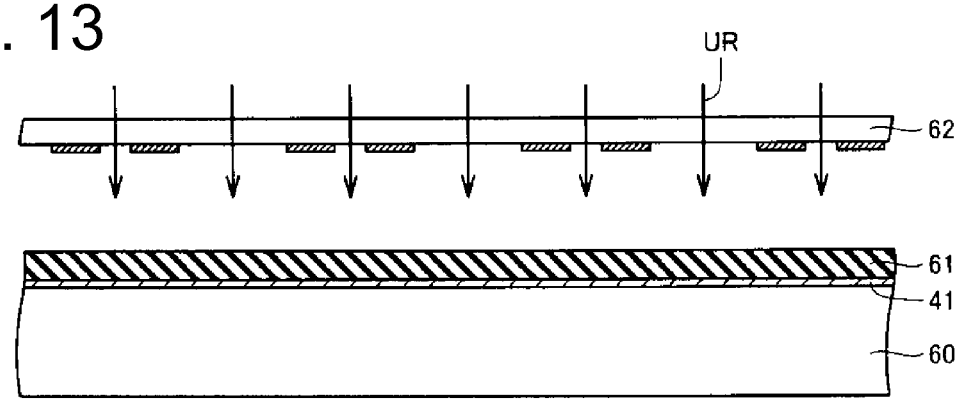
FIG. 13 is a cross-sectional view of the step after the manufacturing step in FIG. 12.

Next, as shown in FIG. 13, ultraviolet rays UR are radiated onto the resist layer 61 through a mask 62. The mask 62 has light-shielding patterns arranged in a desired layout on the bottom of a transparent material. The ultraviolet rays UR can be generated by a high pressure mercury lamp or the like.

Figure 14:
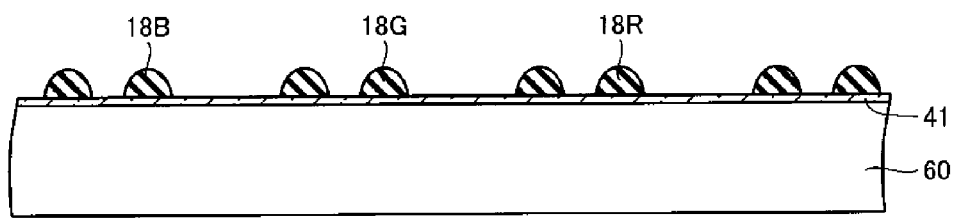
FIG. 14 is a cross-sectional view of the step after the manufacturing step in FIG. 13.

Next, as shown in FIG. 14, the resist layer 61 that has been irradiated by the ultraviolet rays UR is developed. Specifically, an inorganic or organic alkali is used to dissolve the portions of the resist layer 61 that have been exposed to light. A baking treatment is applied to the portions that remain after the dissolving, thereby forming the boundary parts 18B, 18G, and 18R. The baking process is not mandatory.

This makes it possible to make the boundary parts 18B, 18G, and 18R having curved peripheral surfaces by performing photolithography on the resist layer 61.

Figure 15:
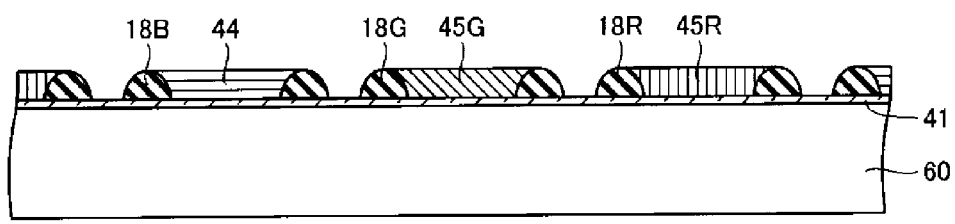
FIG. 15 is a cross-sectional view of the step after the manufacturing step in FIG. 14.

Next, as shown in FIG. 15, the light scattering member 44, the green phosphor 45G, and the red phosphor 45R are formed by ink jet deposition. The light scattering member 44 is formed by coating scattering materials inside a hole formed by the boundary parts 18B. The green phosphor 45G is formed by coating a green phosphor material inside the hole formed by the boundary parts 18G. The red phosphor 45R is formed by coating a red phosphor material inside the hole formed by the boundary parts 18R. A heating treatment may be applied after the respective materials have been coated.

With the ink jet deposition, the scattering materials, green phosphor materials, and red phosphor materials can be coated together, thereby shortening the manufacturing time as compared to if photolithography were used. The amount of materials used for coating can also be reduced.

Figure 16:
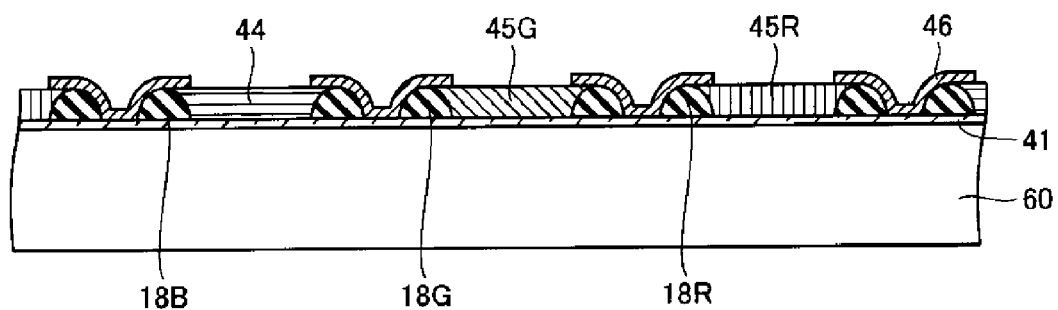
FIG. 16 is a cross-sectional view of the step after the manufacturing step in FIG. 15.

Next, as shown in FIG. 16, a metal film is formed by sputtering or vapor deposition to cover the boundary parts 18B, 18G, and 18R, the light scattering member 44, the green phosphor 45G, and the red phosphor 45R. Aluminum, silver, an alloy thereof, or the like is used as the metal. The slant angle of the bottom end side (transparent substrate 60 side) of the peripheral surface of the boundary part 18R, 18G, and 18B is 60° to 80. Therefore, when forming the metal film, it is possible to suppress metal film from not forming on certain portions.

After the metal film is formed, a resist film is formed on this metal film. Photolithography is performed on this resist film to pattern the resist film. This patterned resist film is used to etch the metal film. As shown in FIG. 16, this forms the reflective member 46. In this manner, it is possible to manufacture the color conversion substrate 4 according to the present embodiment.

Next, the method of manufacturing the opposite substrate 6 after the color conversion substrate 4 has been manufactured as described above will be explained.

Figure 17:
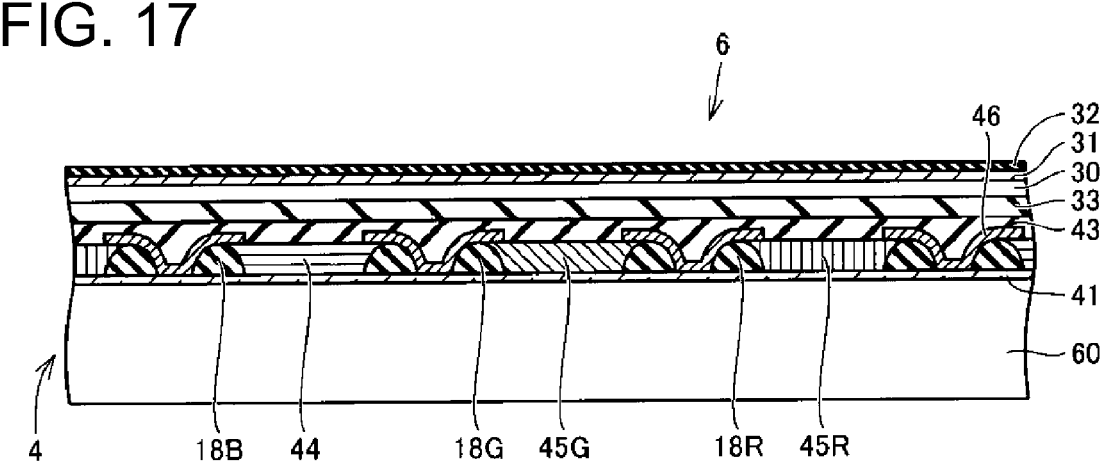
FIG. 17 is a cross-sectional view of the step after the manufacturing step in FIG. 16.

In FIG. 17, the planarizing film 43 is formed by a thermosetting or ultraviolet-curing transparent acrylic-based resin or the like on the reflective member 46 of the color conversion substrate 4. Next, the polarizing plate 33 is formed on the planarizing film 43. The transparent insulating film 30 is formed on the polarizing plate 33 with a silicon oxide film, a silicon nitride film, or the like, for example. Next, a transparent conductive film such as an ITO film or an IZO filmed is formed. This transparent conductive film is patterned to form the opposite electrode 31. Next, the alignment film 32 is formed to cover the opposite electrode 31.

In this manner, when manufacturing the opposite substrate 6 that has been integrated with the color conversion substrate 4, one glass substrate can be omitted and the manufacturing steps can be reduced as compared to if an ordinary opposite substrate were to be manufactured individually.

The display device 1 according to the present embodiment can be applied to TN, VA, ECB, and IPS liquid crystal driving modes.

Figure 18:
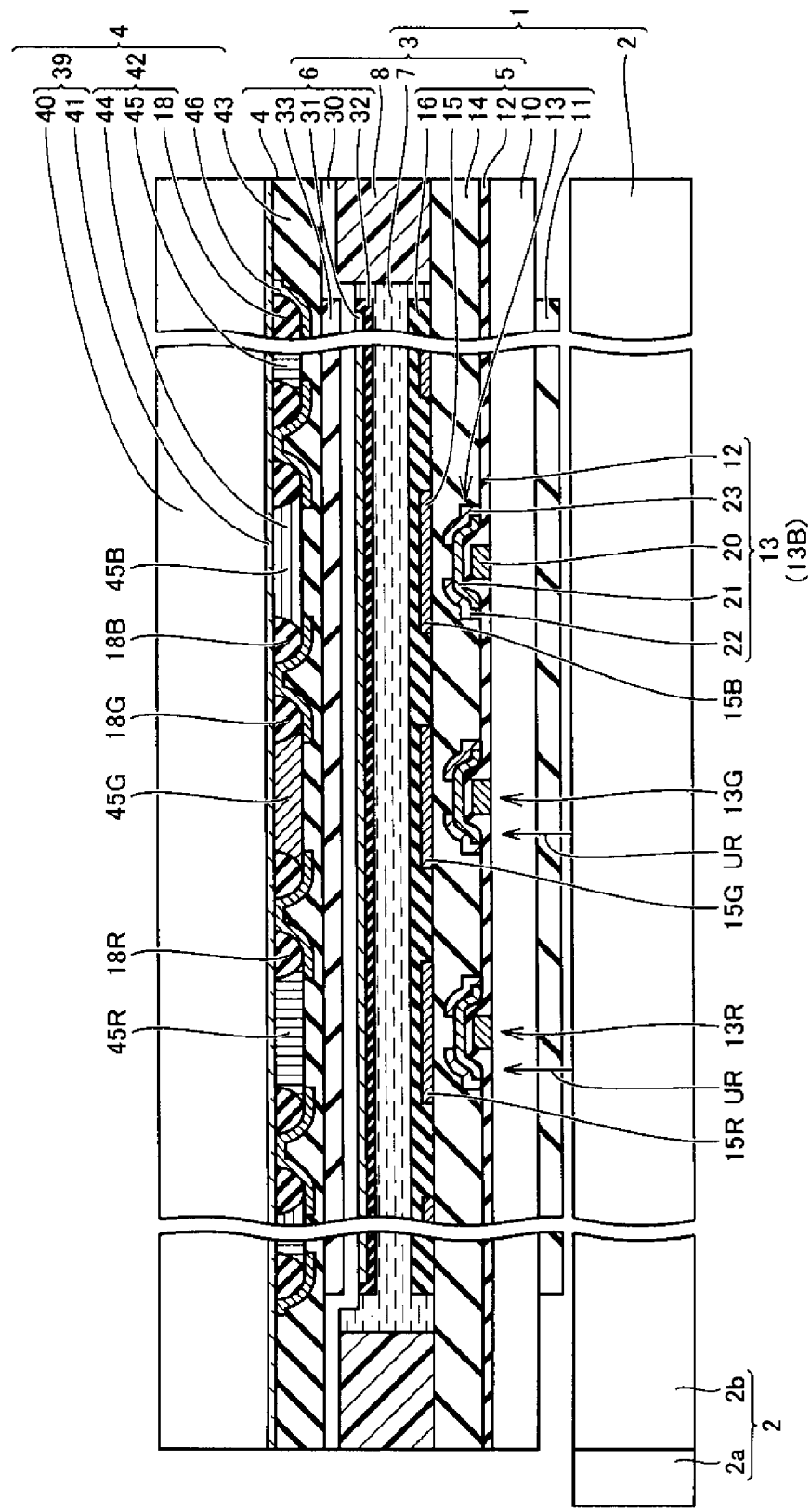
FIG. 18 is a cross-sectional view of a first modification example of the display device 1 according to Embodiment 1.

FIG. 18 is a cross-sectional view of a first modification example of a display device 1 according to Embodiment 1. In the example shown in FIG. 18, a blue phosphor 45B is used instead of the light scattering member 44. The light source module 2 radiates the ultraviolet rays UR towards the liquid crystal module 3.

The ultraviolet rays UR enter the selected red phosphor 45R, green phosphor 45G, and blue phosphor 45B. In the example shown in FIG. 18, the ultraviolet rays UR enter the red phosphor 45R and excite the red phosphor, thereby causing red light to be emitted. The green phosphor 45G also emits green light when the ultraviolet rays UR enter, and the blue phosphor 45B emits blue light when the ultraviolet rays UR enter.

In the example shown in FIG. 18, the peripheral surfaces of the green phosphor 45G, red phosphor 45R, and blue phosphor 45B are curved as shown in FIGS. 3 and 4.

Embodiment 2

A display device 1 according to Embodiment 2 will be described with reference to FIG. 19. Elements of the configuration in FIG. 19 that are the same or equivalent to elements in FIGS. 1 to 18 are given the same reference character and an explanation thereof will be omitted.

Figure 19:
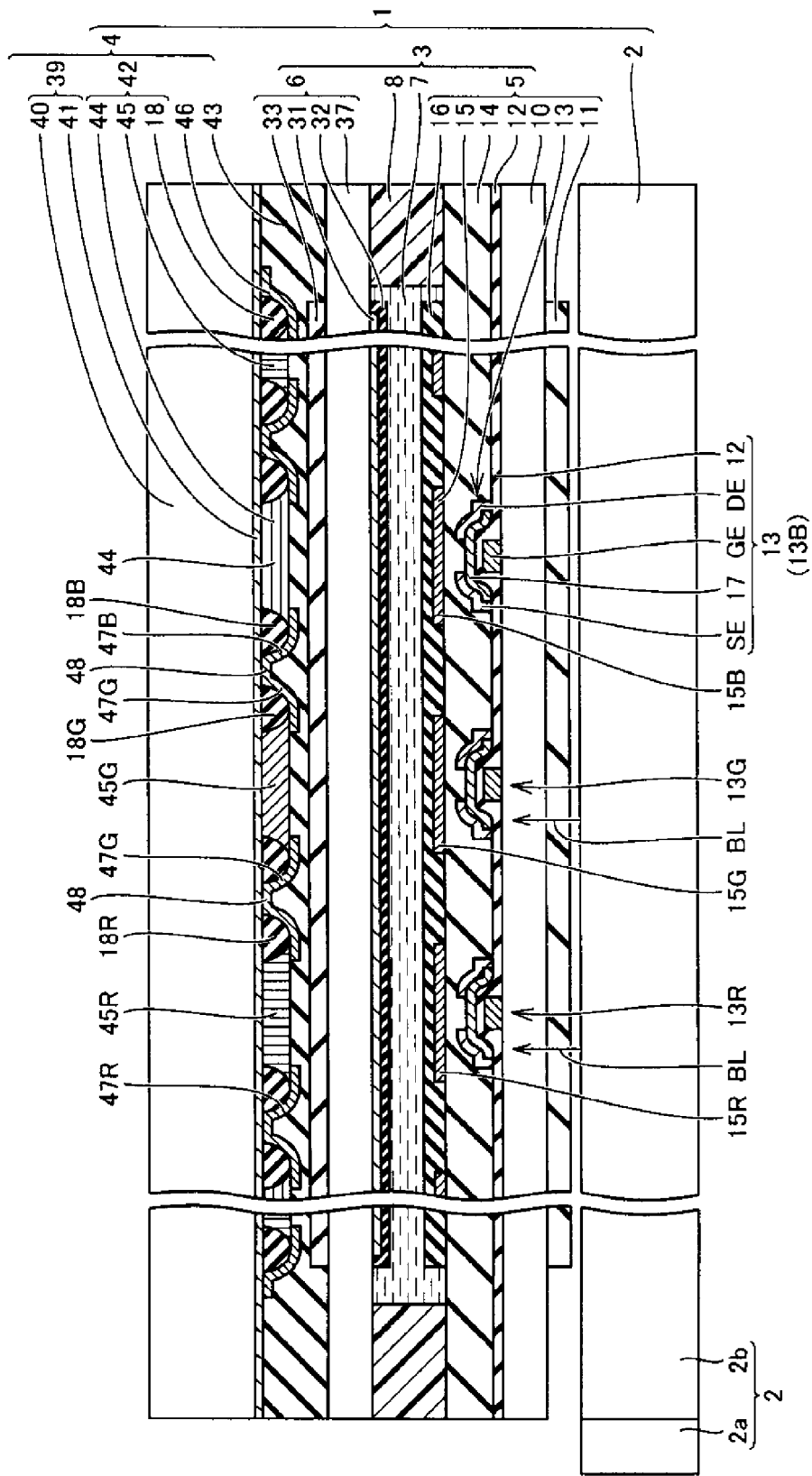
FIG. 19 is a cross-sectional view of a display device 1 according to Embodiment 2.

FIG. 19 is a cross-sectional view of the display device 1 according to Embodiment 2. The display device 1 includes a light source module 2, a liquid crystal module 3 disposed on the light source module 2, and a color conversion substrate 4 disposed on the liquid crystal module 3. In Embodiment 2, the liquid crystal module 3 and the color conversion substrate 4 are different components, and the color conversion substrate 4 is mounted on the liquid crystal module 3.

Therefore, an opposite substrate 6 includes a transparent substrate 37, an opposite electrode 31 formed on the portion of the main surface of the transparent substrate 37 facing the TFT substrate 5, and an alignment film 32 that covers this opposite electrode 31. The opposite substrate 6 includes a polarizing plate 33 formed on a surface that is opposite to the surface where the opposite electrode is formed 31 on the transparent substrate 37. The color conversion substrate 4 includes a main plate 39, a phosphor layer 42 formed on the main plate 39, a reflective member 46 formed on the phosphor layer 42, and a planarizing film 43 that covers the reflective member 46 and the phosphor layer 42. In Embodiment 2, the planarizing film 43 is adhesive and adheres the opposite substrate 6 to the color conversion substrate 4.

The main plate 39 includes an emitting surface and a main surface that is located on a side opposite to this emitting surface. The phosphor layer 42 is disposed on the main surface that is on a side opposite to the emitting surface.

The main plate 39 includes a transparent substrate 40 and a low refractive index film 41 formed on the bottom surface of the transparent substrate 40. The phosphor layer 42 includes a red phosphor 45R, a green phosphor 45G, a light scattering member 44, and boundary parts 18R, 18G, and 18*b* respectively surrounding the red phosphor 45R, green phosphor 45G, and light scattering member 44.

In Embodiment 2, the outer peripheral surfaces of the respective boundary parts 18R, 18G, and 18B have curved surfaces in a manner similar to Embodiment 1, and the reflective member 46 is formed on the curved outer peripheral surface.

The display device 1 of Embodiment 2 can also improve light use efficiency, in a manner similar to the display device 1 of Embodiment 1.

Figure 20:
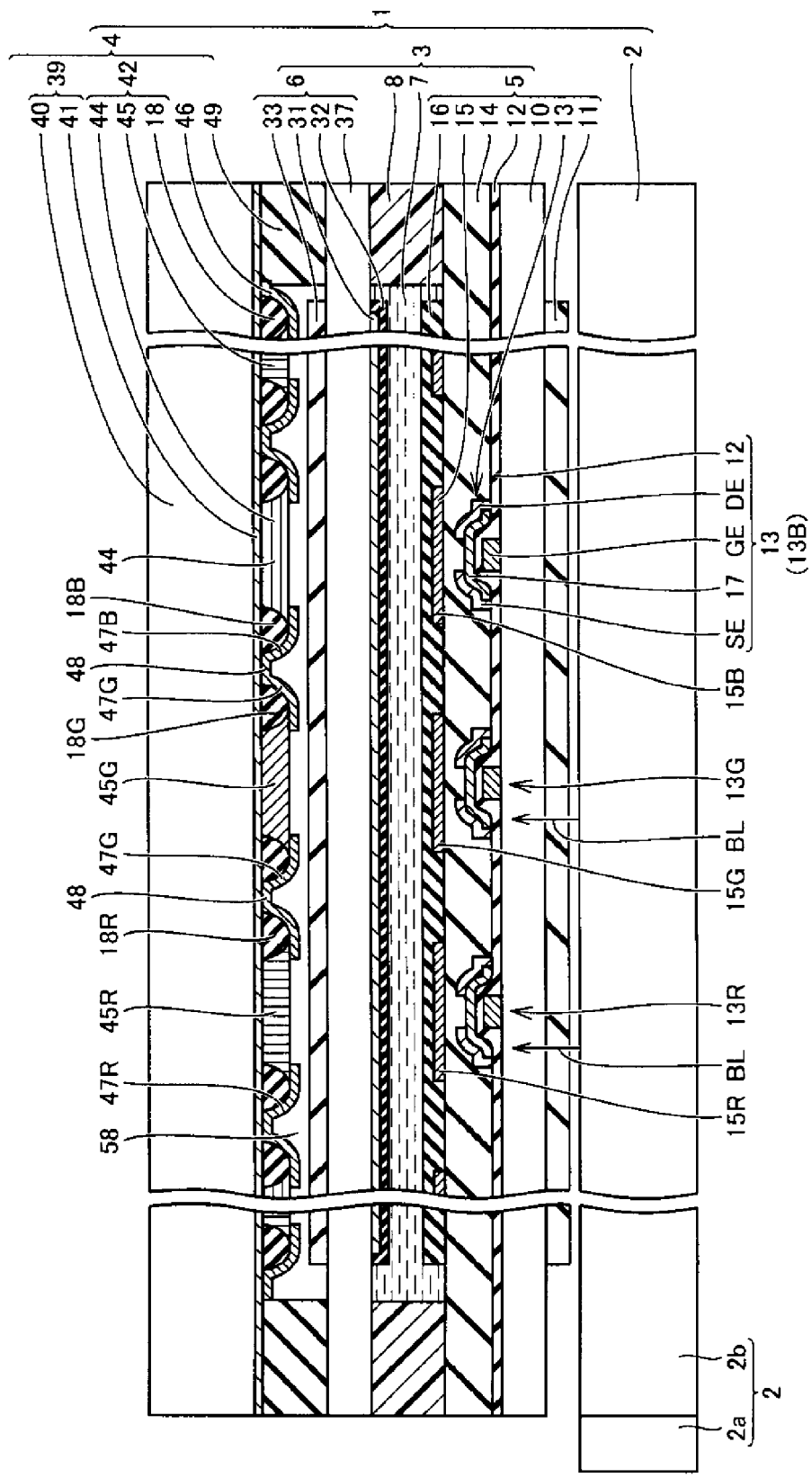
FIG. 20 is a cross-sectional view of a modification example of the display device 1 according to Embodiment 2.

FIG. 20 is a cross-sectional view of a modification example of the display device 1 according to Embodiment 2. In the example shown in FIG. 20, the display device 1 includes a support member 49 disposed between the color conversion substrate 4 and the opposite substrate 6 and the vicinity of the outer edges of the respective substrates. This defines an air layer 58 between the color conversion substrate 4 and the opposite substrate 6.

The refractive index of the air layer 58 is less than the refractive index of the red phosphor 45R, green phosphor 45G, and light scattering member 44. Therefore, in the example shown in FIG. 20, the light emitted by the red phosphor 45R and the green phosphor 45G can be suppressed from traveling towards the opposite substrate 6, and the light scattered by the light scattering member 44 can be suppressed from traveling towards the opposite substrate 6.

Embodiments 1 and 2 described an example in which the color conversion substrate 4 of the present invention was applied to a liquid crystal display device having a side-lit backlight, but the color conversion substrate 4 can be applied to various types of display devices.

Figure 21:
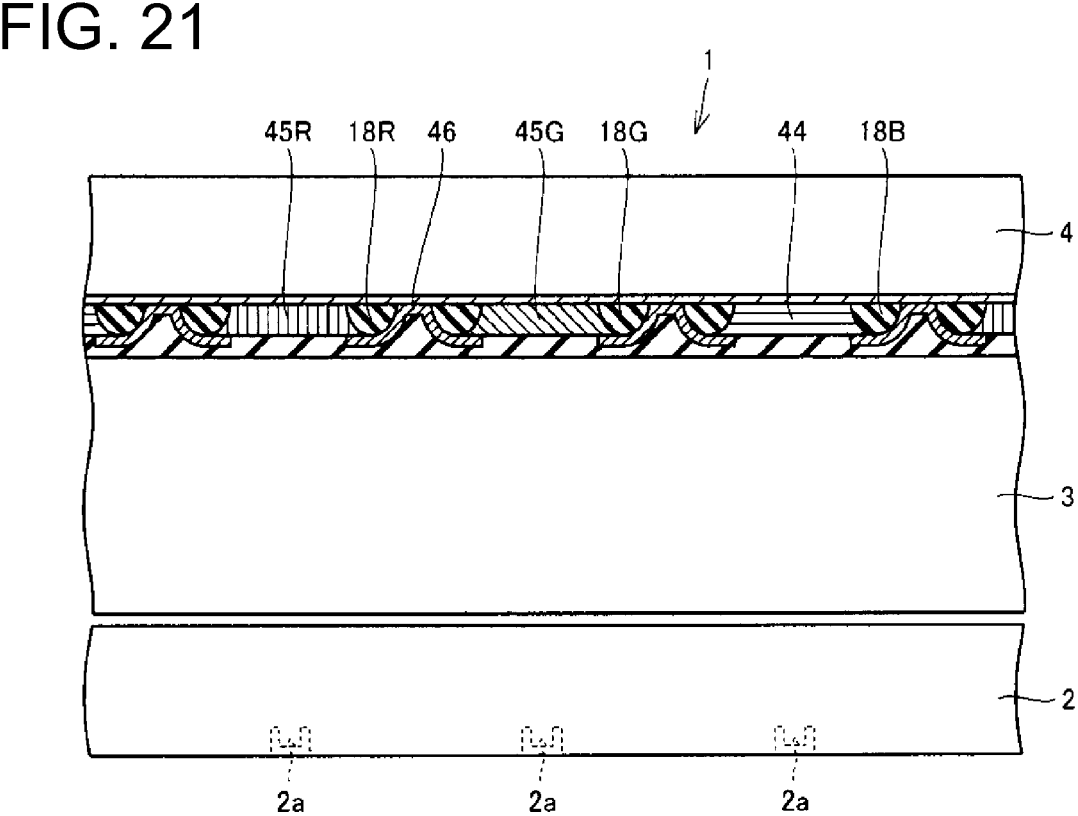
FIG. 21 is a schematic view of a first modification example of Embodiments 1 and 2.

FIG. 21 is a schematic view of a first modification example of Embodiments 1 and 2. In the example shown in FIG. 21, a direct-lit light source module 2 in which a plurality of LEDs 2*a* are arrayed is used. Cold cathode fluorescent tubes may be used instead of the plurality of LEDs.

Figure 22:
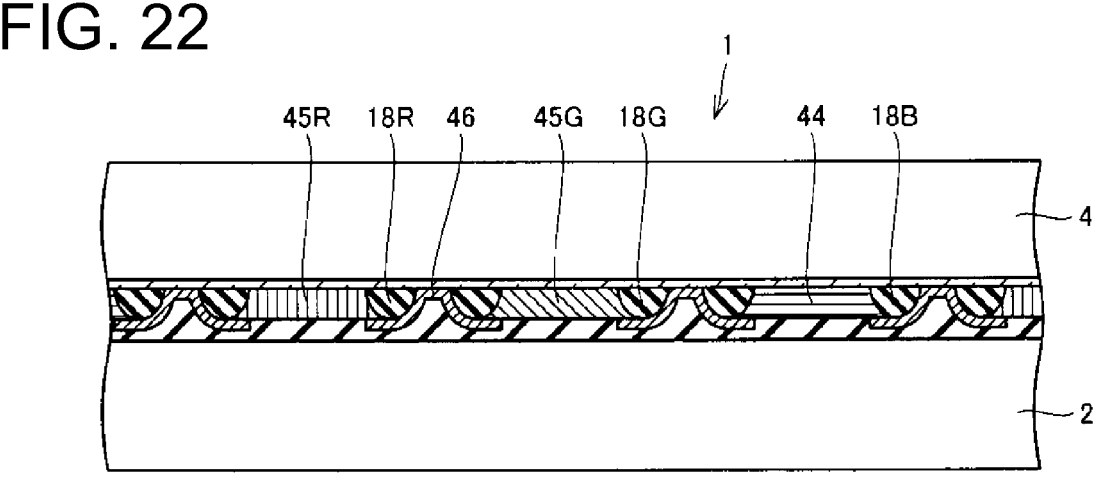
FIG. 22 is a schematic view of a second modification example.

FIG. 22 is a schematic view of a second modification example. In the example shown in FIG. 22, the light source module 22 is an organic EL panel or an inorganic EL panel in which the amount of light is adjustable. The light source module 2 and the color conversion substrate 4 are adhered together by an adhesive agent or the like. In the example shown in FIG. 22, it is not necessary to use a light shutter device such as a liquid crystal panel.

Figure 23:
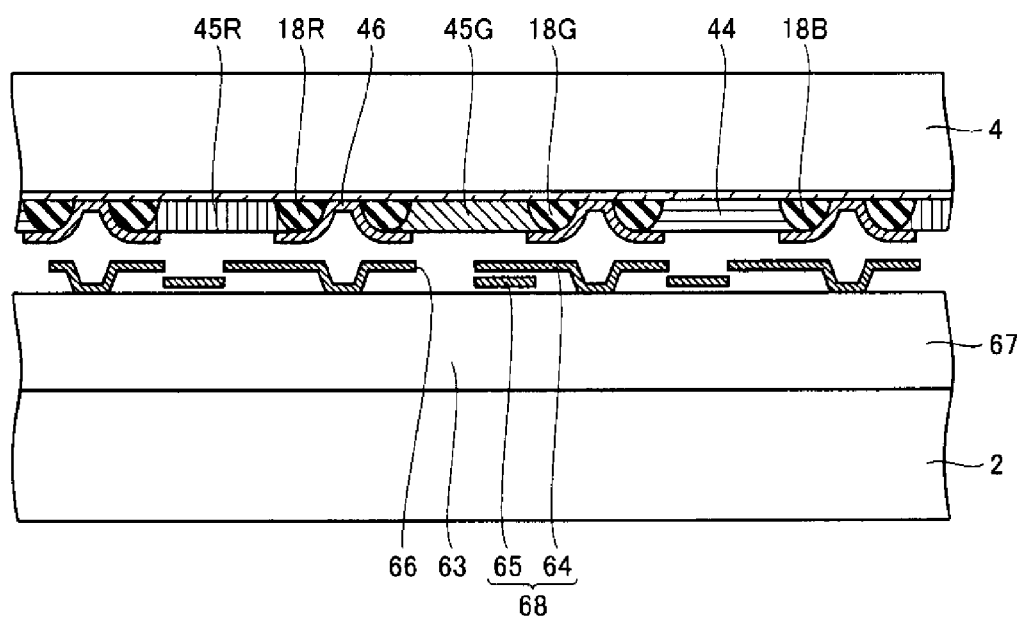
FIG. 23 is a cross-sectional view of a third modification example.

FIG. 23 is a cross-sectional view of a third modification example, and the display device 1 in FIG. 23 includes a light source module 2, a light shutter 67, and a color conversion substrate 4. The light shutter 67 includes a transparent substrate 63 and a plurality of shutter elements 68 formed on the main surface of the transparent substrate 63. The shutter elements 68 are disposed in locations facing the red phosphor 45R, green phosphor 45G, and light scattering member 44.

Each of the shutter elements 68 has a light-shielding wall 64 with an opening 66 and gap therein, and a shutter 65 that is movable inside the light shielding wall 64. Movement of the shutter 65 adjusts the amount of light traveling towards the liquid crystal module 3 from the opening 66. In this manner, it is possible to use the light shutter 67, which is a MEMS shutter.

Various embodiments based on the present invention were described above, but all of the embodiments described above are illustrative in every respect and shall not be construed as limiting. The technical scope of the present invention is defined by the claims, and all modifications with the same meaning as the claims and within the scope defined thereby are included.

DESCRIPTION OF REFERENCE CHARACTERS 1 display device
2 light source module
2a LED
2b light guide plate
3 liquid crystal module
4 color conversion substrate
5 substrate
6 opposite substrate
7 liquid crystal layer
8 sealing member
10, 40, 63 transparent substrate
11, 33 polarizing plate
12 gate insulating film
13, 13R, 13G, 13B transistor
14 interlayer insulating film
15, 15R, 15G, 15B pixel electrode
16, 32 alignment film
17 semiconductor layer
18, 18B, 18G, 18R boundary part
20, 50 emitting surface
21, 51 bottom surface
22, 25, 26, 52, 55 peripheral surface
24, 54 opposite surface
26 inner peripheral surface
27, 56 outer peripheral surface
28, 35 side wall
29, 36 protrusion
30 transparent insulating film
31 opposite electrode
34, 53 light receiving surface
39 main plate
40 transparent substrate
41 low refractive index layer
42 phosphor layer
43 planarizing film
44 light scattering member
45 phosphor
45B blue phosphor
45G green phosphor
45R red phosphor
46 reflective member
47, 47B, 47G, 47R reflective part
48 connection part
60 transparent substrate
61 resist layer
62 mask
64 light-shielding wall
65 shutter
66 opening
67 light shutter
68 shutter element
BL blue light
D1, D2 array direction
DE drain electrode
GE gate electrode
L1, L2, L3, L4, L5, L6 tangent line
LB, LR, LG, LL length
O1 curvature center
P1 first location
P2 second location
P3, P6 top end
P4 fourth location
P5 fifth location
RL, RL1, RL2, RL3, RL4 red light
SE source electrode
UR ultraviolet ray
V reference direction
d1, d2 thickness

What is claimed is:

1. A color conversion substrate, comprising:
a transparent substrate having a main surface;
a phosphor layer disposed on said main surface of the transparent substrate, said phosphor layer having a plurality of phosphors arranged along the main surface and a plurality of first transparent boundary parts formed so as to surround the respective phosphors; and
a plurality of first reflective parts formed on a peripheral surface of the respective first transparent boundary parts,
wherein a portion of each of the first transparent boundary parts attached to the respective first reflective parts is a curved surface, and
wherein a curvature of said curved surface of the respective first transparent boundary parts is $0.50/d1$ to $0.83/d1$, where $d1$ is a thickness of the respective first transparent boundary parts.

2. The color conversion substrate according to claim 1, wherein a portion of the peripheral surface of the respective first transparent boundary parts contacting the main surface of the transparent substrate forms an angle to said main surface that is 60° to 80°.

3. The color conversion substrate according to claim 1, wherein a cross-sectional area of each of the phosphors becomes progressively smaller from a bottom to a top thereof, the bottom being a first phosphor surface facing the main surface of the transparent substrate and the top being a second phosphor surface on a side opposite to said first phosphor surface, and
wherein the first reflective parts each include a lateral protrusion that extends from the peripheral surface of the respective first transparent boundary parts to above the second phosphor surface of the respective phosphors.

4. The color conversion substrate according to claim 1, wherein the phosphor layer further includes a plurality of diffusion members and a plurality of second transparent boundary parts formed so as to surround the respective diffusion members,
wherein the phosphor layer further includes second reflective parts formed on a peripheral surface of the respective second transparent boundary parts,
wherein a portion of each of the second transparent boundary parts attached to the respective second reflective parts is a curved surface, and
wherein a curvature of said curved surface of the respective second transparent boundary parts is $0.50/d2$ to $0.83/d2$, where $d2$ is a thickness of the respective second transparent boundary parts.

5. The color conversion substrate according to claim 1, further comprising:
a low refractive index layer interposed between the phosphor layer and the main surface of the transparent substrate,
wherein a refractive index of the low refractive index layer is less than a refractive index of the respective phosphors.

6. A liquid crystal display device having the color conversion substrate according to claim 1, the liquid crystal display device comprising:

a thin film transistor substrate;

an opposite substrate having the color conversion substrate, said opposite substrate being disposed on the thin film transistor substrate with a gap therebetween; and a liquid crystal layer provided in the gap between the thin film transistor substrate and the opposite substrate, wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

7. The liquid crystal display device according to claim 6, further comprising:

a planarizing film provided between the color conversion substrate and the polarization film, wherein a portion of the planarizing film adjacent to the polarization film has a planarized surface, and wherein a refractive index of the planarizing film is less than a refractive index of the respective phosphors.

8. The color conversion substrate according to claim 2, wherein a cross-sectional area of each of the phosphors becomes progressively smaller from a bottom to a top thereof, the bottom being a first phosphor surface facing the main surface of the transparent substrate and the top being a second phosphor surface on a side opposite to said first phosphor surface, and wherein the first reflective parts each include a lateral protrusion that extends from the peripheral surface of the respective first transparent boundary parts to above the second phosphor surface of the respective phosphors.

9. The color conversion substrate according to claim 2, wherein the phosphor layer further includes a plurality of diffusion members and a plurality of second transparent boundary parts formed so as to surround the respective diffusion members, wherein the phosphor layer further includes second reflective parts formed on a peripheral surface of the respective second transparent boundary parts, wherein a portion of each of the second transparent boundary parts attached to the respective second reflective parts is a curved surface, and wherein a curvature of said curved surface of the respective second transparent boundary parts is $0.50/d2$ to $0.83/d2$, where $d2$ is a thickness of the respective second transparent boundary parts.

10. The color conversion substrate according to claim 3, wherein the phosphor layer further includes a plurality of diffusion members and a plurality of second transparent boundary parts formed so as to surround the respective diffusion members, wherein the phosphor layer further includes second reflective parts formed on a peripheral surface of the respective second transparent boundary parts, wherein a portion of each of the second transparent boundary parts attached to the respective second reflective parts is a curved surface, and wherein a curvature of said curved surface of the respective second transparent boundary parts is $0.50/d2$ to $0.83/d2$, where $d2$ is a thickness of the respective second transparent boundary parts.

11. The color conversion substrate according to claim 8, wherein the phosphor layer further includes a plurality of diffusion members and a plurality of second transparent boundary parts formed so as to surround the respective diffusion members, wherein the phosphor layer further includes second reflective parts formed on a peripheral surface of the respective second transparent boundary parts, wherein a portion of each of the second transparent boundary parts attached to the respective second reflective parts is a curved surface, and wherein a curvature of said curved surface of the respective second transparent boundary parts is $0.50/d2$ to $0.83/d2$, where $d2$ is a thickness of the respective second transparent boundary parts.

12. A liquid crystal display device having the color conversion substrate according to claim 2, the liquid crystal display device comprising:

a thin film transistor substrate;

an opposite substrate having the color conversion substrate, said opposite substrate being disposed on the thin film transistor substrate with a gap therebetween; and a liquid crystal layer provided in the gap between the thin film transistor substrate and the opposite substrate, wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

13. A liquid crystal display device having the color conversion substrate according to claim 3, the liquid crystal display device comprising:

a thin film transistor substrate;

an opposite substrate having the color conversion substrate, said opposite substrate being disposed on the thin film transistor substrate with a gap therebetween; and a liquid crystal layer provided in the gap between the thin film transistor substrate and the opposite substrate, wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

14. A liquid crystal display device having the color conversion substrate according to claim 8, the liquid crystal display device comprising:

a thin film transistor substrate;

an opposite substrate having the color conversion substrate, said opposite substrate being disposed on the thin film transistor substrate with a gap therebetween; and a liquid crystal layer provided in the gap between the thin film transistor substrate and the opposite substrate, wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

15. A liquid crystal display device having the color conversion substrate according to claim 4, the liquid crystal display device comprising:

a thin film transistor substrate;

an opposite substrate having the color conversion substrate, said opposite substrate being disposed on the thin film transistor substrate with a gap therebetween; and a liquid crystal layer provided in the gap between the thin film transistor substrate and the opposite substrate, wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

16. A liquid crystal display device having the color conversion substrate according to claim 9, the liquid crystal display device comprising:
   a thin film transistor substrate;
   an opposite substrate having the color conversion substrate, said opposite substrate being disposed on the thin film transistor substrate with a gap therebetween; and
   a liquid crystal layer provided in the gap between the thin film transistor substrate and the opposite substrate,
   wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

17. A liquid crystal display device having the color conversion substrate according to claim 10, the liquid crystal display device comprising:
   a thin film transistor substrate;
   an opposite substrate having the color conversion substrate, said opposite substrate being disposed on the thin film transistor substrate with a gap therebetween; and
   a liquid crystal layer provided in the gap between the thin film transistor substrate and the opposite substrate,
   wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

18. A liquid crystal display device having the color conversion substrate according to claim 11, the liquid crystal display device comprising:
   a thin film transistor substrate;
   an opposite substrate having the color conversion substrate, said opposite substrate being disposed on the thin film transistor substrate with a gap therebetween; and
   a liquid crystal layer provided in the gap between the thin film transistor substrate and the opposite substrate,
   wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

19. A liquid crystal display device having the color conversion substrate according to claim 5, the liquid crystal display device comprising:
   a thin film transistor substrate;
   an opposite substrate having the color conversion substrate, said opposite substrate being disposed on the thin film transistor substrate with a gap therebetween; and
   a liquid crystal layer provided in the gap between the thin film transistor substrate and the opposite substrate,
   wherein the opposite substrate includes a polarization film disposed closer to the thin-film transistor substrate than the color conversion substrate, a transparent conductive film disposed closer to the thin film transistor substrate than the color conversion substrate, and an alignment film disposed closer to the thin film transistor substrate than the transparent conductive film.

* * * * *